(12) United States Patent
Jungvig

(10) Patent No.: US 6,454,455 B1
(45) Date of Patent: Sep. 24, 2002

(54) STIRRER

(76) Inventor: Carl Gustav Jungvig, 2472 N. Foothill Blvd., Los Altos, CA (US) 94024

(*) Notice: Subject to any disclaimer, the term of this patent is extended or adjusted under 35 U.S.C. 154(b) by 0 days.

(21) Appl. No.: 09/659,603

(22) Filed: Sep. 11, 2000

(51) Int. Cl.[7] .............................................. B01F 13/00
(52) U.S. Cl. ................... 366/129; 366/343; D7/300.2; D7/688
(58) Field of Search ................... 366/129, 315, 366/316, 317, 256, 332, 333, 343; D7/300.2, 688; 241/169.2

(56) References Cited

U.S. PATENT DOCUMENTS

| | | | |
|---|---|---|---|
| 188,383 A | * 3/1877 | Leslie | |
| 563,431 A | * 7/1896 | Strang | 366/129 |
| 604,965 A | * 5/1898 | Cartwright | |
| 612,110 A | * 10/1898 | Isham | 366/256 |
| 719,467 A | * 2/1903 | Holder | |
| 790,226 A | * 5/1905 | Rohrer | |
| 820,631 A | * 5/1906 | Eckart | 366/315 |
| 861,603 A | 7/1907 | Newton | |
| 1,098,622 A | * 6/1914 | Grahm | 366/333 |
| 1,241,307 A | 9/1917 | Tompkins | |
| 1,243,982 A | * 10/1917 | Rupp | 366/332 |
| 1,292,643 A | * 1/1919 | Pyle | 366/332 |
| 2,088,376 A | * 7/1937 | Kaskey | 366/256 |
| 2,243,236 A | * 5/1941 | Walsh | |
| 2,329,437 A | * 9/1943 | Corwin | 366/256 |
| 2,442,353 A | * 6/1948 | Gordean | |
| 2,503,643 A | * 4/1950 | Verbrugge | 366/129 |
| 2,555,756 A | * 6/1951 | Muehlhaus et al. | 366/256 |
| 2,615,692 A | * 10/1952 | Muller | 366/332 |
| 4,073,530 A | 2/1978 | Seidler | |
| 4,171,166 A | * 10/1979 | Trowbridge et al. | 366/316 |
| 4,211,156 A | * 7/1980 | Zimmerman | 366/343 |
| 4,285,114 A | * 8/1981 | Underdahl | |
| 4,380,840 A | * 4/1983 | Rieckenberg | |
| D282,433 S | * 2/1986 | Rauen et al. | |
| D304,892 S | * 12/1989 | Bevilacqua | |
| D304,894 S | * 12/1989 | Carlson | |
| 4,924,444 A | 5/1990 | Castellanos | |
| 5,033,156 A | * 7/1991 | Stewart | |
| D333,241 S | * 2/1993 | Elkins | |
| 5,490,727 A | * 2/1996 | Poschl | 366/316 |
| D395,987 S | * 7/1998 | Loughead et al. | |
| D399,103 S | * 10/1998 | Lillelund et al. | |
| D405,661 S | * 2/1999 | Erickson | |
| 5,947,595 A | 9/1999 | Eurisch et al. | |
| 6,024,391 A | * 2/2000 | Horn | |
| 6,056,206 A | * 5/2000 | Whiton | |

FOREIGN PATENT DOCUMENTS

| | | | | |
|---|---|---|---|---|
| CH | 121 527 | * | 7/1927 | 366/256 |
| DE | 460 233 | * | 5/1928 | 366/332 |
| FR | 61 589 | * | 5/1955 | 366/332 |
| GB | 16 040 | * | 7/1909 | 366/332 |
| GB | 121 064 | * | 12/1918 | |
| GB | 608 687 | * | 9/1948 | 366/256 |
| NO | 37 047 | * | 1/1927 | 366/256 |

* cited by examiner

*Primary Examiner*—Tony G. Soohoo
(74) *Attorney, Agent, or Firm*—Carol D. Titus; James J. Leary

(57) ABSTRACT

A stirrer for mixing an additive into a liquid has a handle extending upward from a flattened, generally planar mixing element. Although the connection may take other forms, the embodiments shown have the mixing element extending up from the central portion of the mixing element. The handle is connected generally perpendicular to the plane of the mixing element. An alternate embodiment shows the handle connected to the mixing element at an angle of approximately 75 degrees from the plane of the mixing element. The mixing element may be virtually any planar shape, however, a generally round shape is optimal to match most standard drinking glasses.

18 Claims, 7 Drawing Sheets

STIRRER

FIELD OF INVENTION

The present invention relates generally to a stirrer. More particularly it relates to a stirrer for mixing a dry powder into a liquid.

BACKGROUND OF THE INVENTION

Mixing dry ingredients into a liquid may be performed for may reasons. One of the most common is combining an additive to a drink. A dry additive may take the form of a sweetener or creamer for coffee, a natural fiber such as METAMUCIL™ a drink mix such as cocoa or apple cider mix, etc. When mixing in the dry additive, the user generally would like to mix until the combination is fully blended and clump free. However, as we all know from experience, it can be difficult to avoid clumps and lumps when combining a powder with a liquid.

Presently, a user typically uses a spoon to measure and then mix in the dry ingredient. Other users may use other stirring implements, such as the cylindrical solid or tubular coffee stirrers. However, these stirring implements are generally not very effective and the mixing process takes too long and/or the dry ingredient is not fully incorporated into the liquid.

Therefore, there is a need in the industry for a stirrer that can easily and effectively mix an additive or ingredient into a liquid.

SUMMARY OF THE INVENTION

The present invention takes the form of a stirrer for mixing an additive into a liquid. The stirrer has a handle extending upward from a flattened, generally planar mixing element. Although the connection may take other forms, the embodiments shown have the mixing element extending up from the central portion of the mixing element. The handle is connected generally perpendicular to the plane of the mixing element. An alternate embodiment shows the handle connected to the mixing element at an angle of approximately 75 degrees from the plane of the mixing element. The mixing element may be virtually any planar shape, however, a generally round shape is optimal to match most standard drinking glasses. Other objects and advantages of the invention will no doubt occur to those skilled in the art upon reading and understanding the following detailed description along with the accompanying drawings.

DETAILED DESCRIPTION OF THE INVENTION

Figure 2:
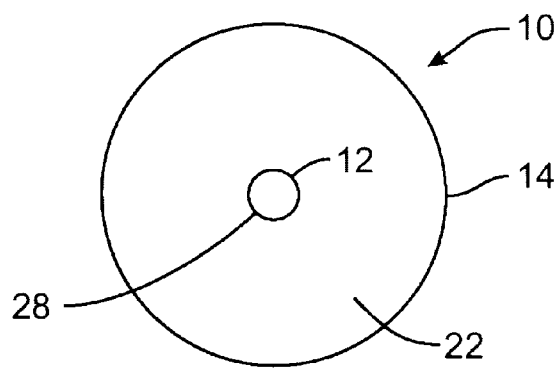
FIG. 2 is a top view of the stirrer.
Figure 1:
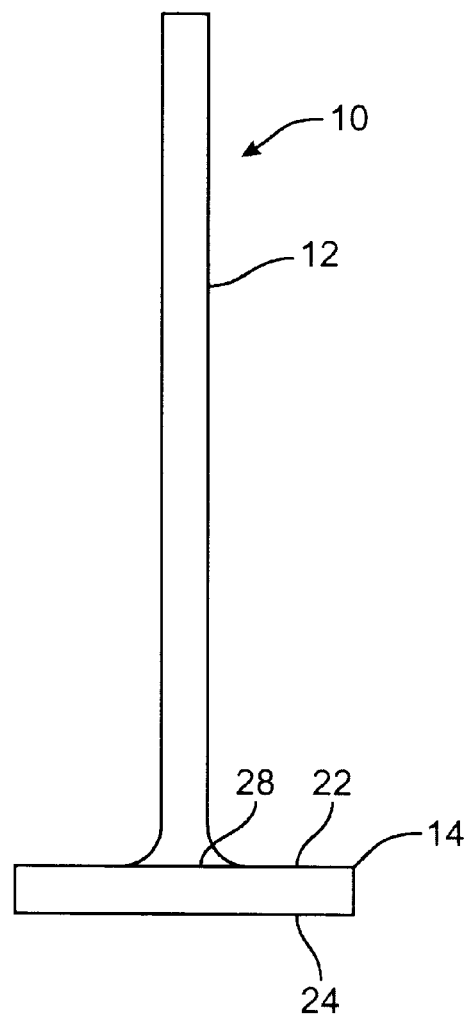
FIG. 1 is a side view of the stirrer.

FIG. 1 is a side view and FIG. 2 a top view of the stirrer 10. The stirrer 10 has two main parts: a handle 12 and a mixing element 14. The handle 12 extends upward from a central portion 28 on the top planar surface 22 of the mixing element. In most embodiments, the mixing element 14 is in the form of a round disk. Although other sizes may be used, for most standard drinking glasses, which range from about 2 to 4 inches in diameter, a mixing element 14 with a diameter of approximately 1 to 3¾ inches is preferred, more preferably between 1¼ and 2 inches, most preferably between 1½ and 2¼ inches. The embodiment shown uses a round disk with a diameter of approximately 1¾ inches. The edge 26 of the mixing element 14 may be rounded or slanted towards the top or the bottom of the element 14.

A user may use the mixing element 14 to scoop an amount of a dry ingredient to be added to the liquid and drop the dry ingredient into the liquid in a mixing and/or drinking vessel. The mixing element is then placed into the liquid near the bottom of the vessel and moved vigorously up and down. Optimally, the bottom surface 24 of the mixing element 14 should touch the bottom of the vessel and/or press the dry ingredient against the bottom of the vessel, thereby using the impact to break apart any larger clumps of the dry ingredient. The vigorous mixing action agitates the liquid creating a swirling motion without causing the spill over the rim of the glass, thereby allowing quick, effective mixing of the dry ingredient into the liquid.

The design shown also has the advantage of being easily cleaned. All of the surfaces of the stirrer 10 are smooth and without deep cavities or crevasses that could retain food particles. For especially easy cleaning a user may fill the mixing vessel with water (preferably warm and slightly soapy) and performing the same mixing action. Any residue remaining will likely be in suspension at this point and the soapy water and residue may be rinsed off. Now, both the stirrer 10 and the mixing vessel are clean and ready to be used again.

Figure 4:
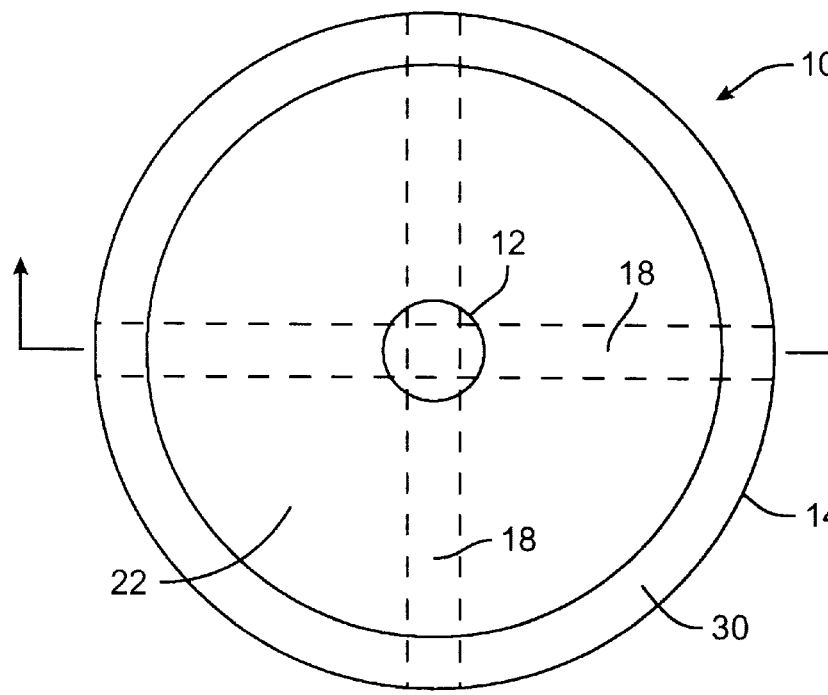
FIG. 4 is a top view of the second embodiment of the stirrer.
Figure 3:
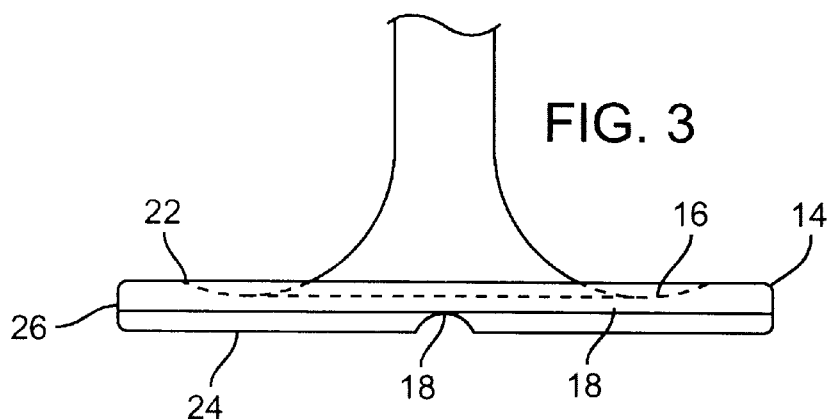
FIG. 3 is a side view of a second embodiment of the stirrer having a top depression and grooves in the bottom.
Figure 5:
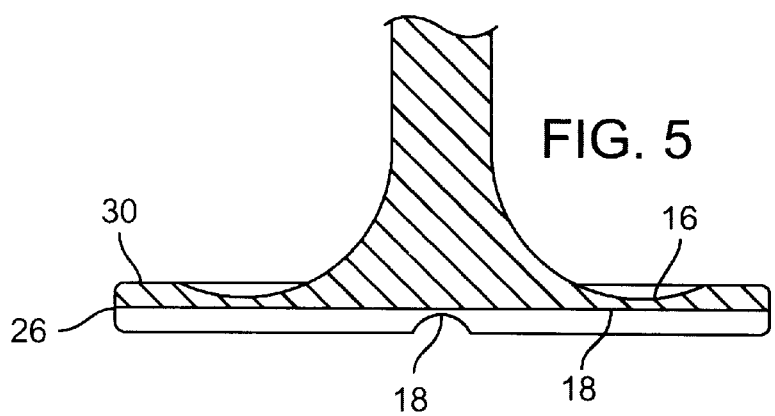
FIG. 5 is a cross-sectional view of the second embodiment of the stirrer.

FIG. 3 is a side view, FIG. 4 a top view and FIG. 5 a cross-sectional view of a second embodiment of the stirrer 10. In this embodiment, the top surface 22 of the mixing element 14 has a rim 30 extending around the periphery thereof, thereby creating a depression 16 in the top 22. The depression 16 may be used to scoop larger quantities of dry ingredient. The second embodiment also has one or more optional grooves 18 in the bottom surface 24 of the mixing element 14. The grooves 18 are to inhibit any chance of a vacuum forming between the bottom surface 24 of the mixing element 14 and the bottom of the vessel. The groove(s) 18 may be linear and perpendicular to one another, as shown, or form any other configuration, as long as the ends of the groove 18 reach the edge of the mixing element 14.

Figure 8:
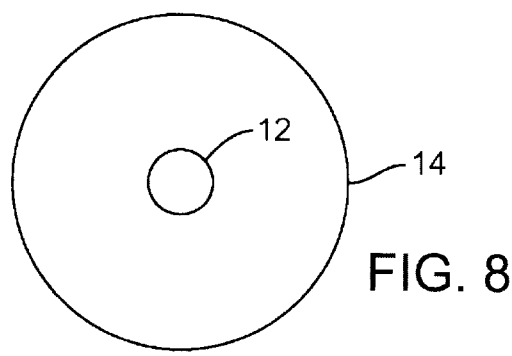
FIG. 8 is a top view of the third embodiment of the stirrer.
Figure 6:
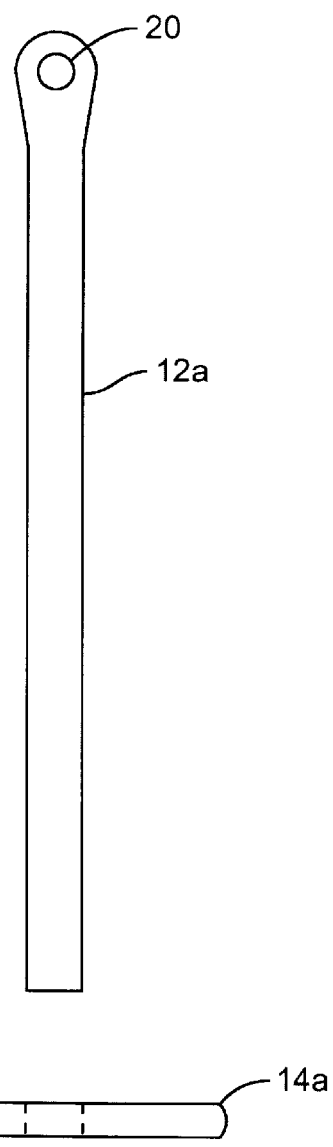
FIG. 6 is an exploded view of a third embodiment of the stirrer having a suspension hole.
Figure 7:
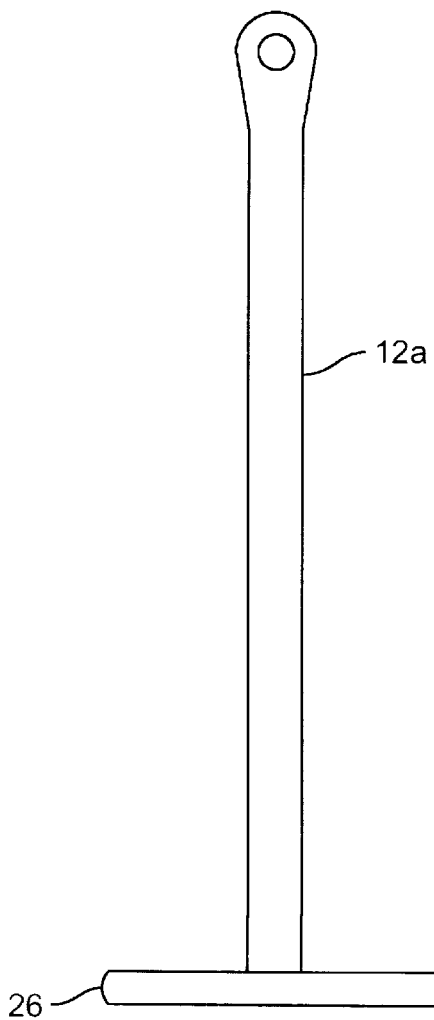
FIG. 7 is an assembled view of the third embodiment of the stirrer.

FIG. 6 is an exploded view, FIG. 7 an assembled view and FIG. 8 a top view of a third embodiment of the stirrer 10. The third embodiment of the stirrer 10 has a hole 20 in the upper end of an alternate handle 12a. The hole 20 is provided to allow the user to suspend the stirrer 10 from a nail, hook or other projection. In this case, the stirrer 10 is assembled from two separately manufactured pieces: a mixing disk 14a and a detachable handle 12a. The pieces 12a, 14a may be attached by welding, threading, hot staking, gluing, press-fitting or other suitable mechanical or chemical attachments. Alternately, the stirrer 10 may be formed from a single molded or machined part.

Figure 10:
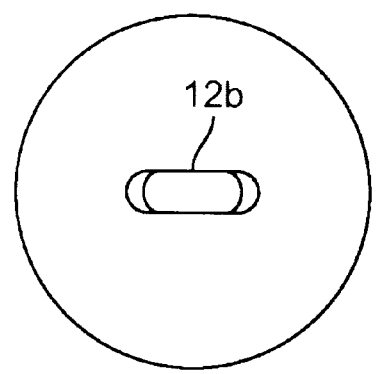
FIG. 10 is a top view of the fourth embodiment.
Figure 9:
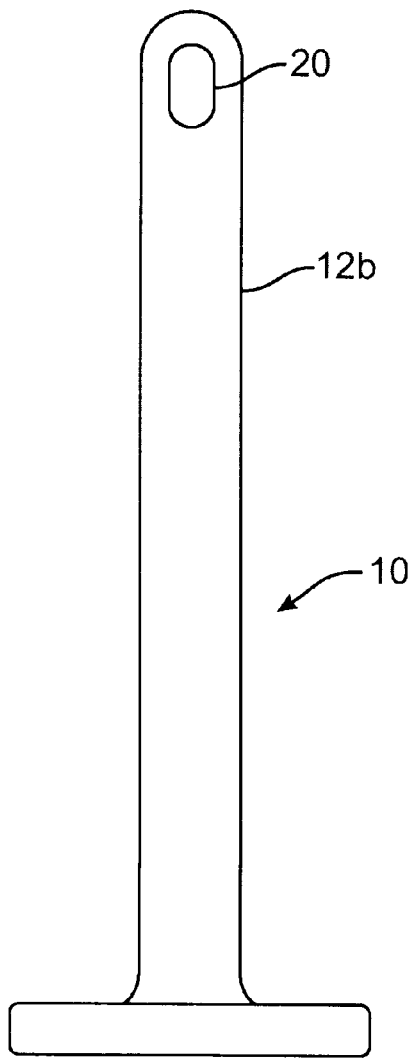
FIG. 9 is a side view of a fourth embodiment of the stirrer with an oval handle.

FIG. 9 is a side view and FIG. 10 is a top view of a fourth embodiment of the stirrer 10. In the fourth embodiment, the cross section of the handle 12b is elongated to form an oval or rectangle or other non-round shape, thereby creating an easily gripped shape.

Figure 12:
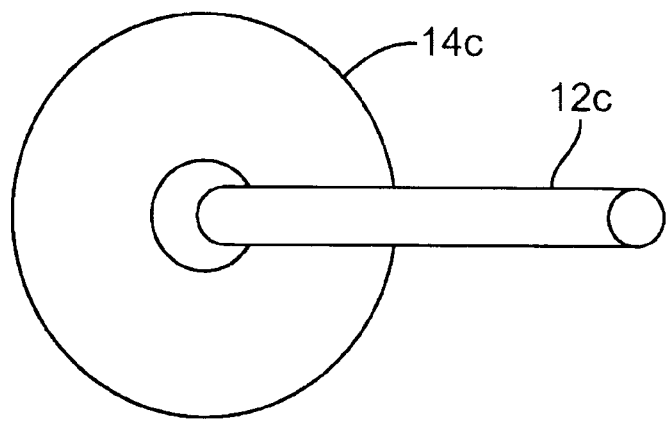
FIG. 12 is a top view of the fifth embodiment.
Figure 11:
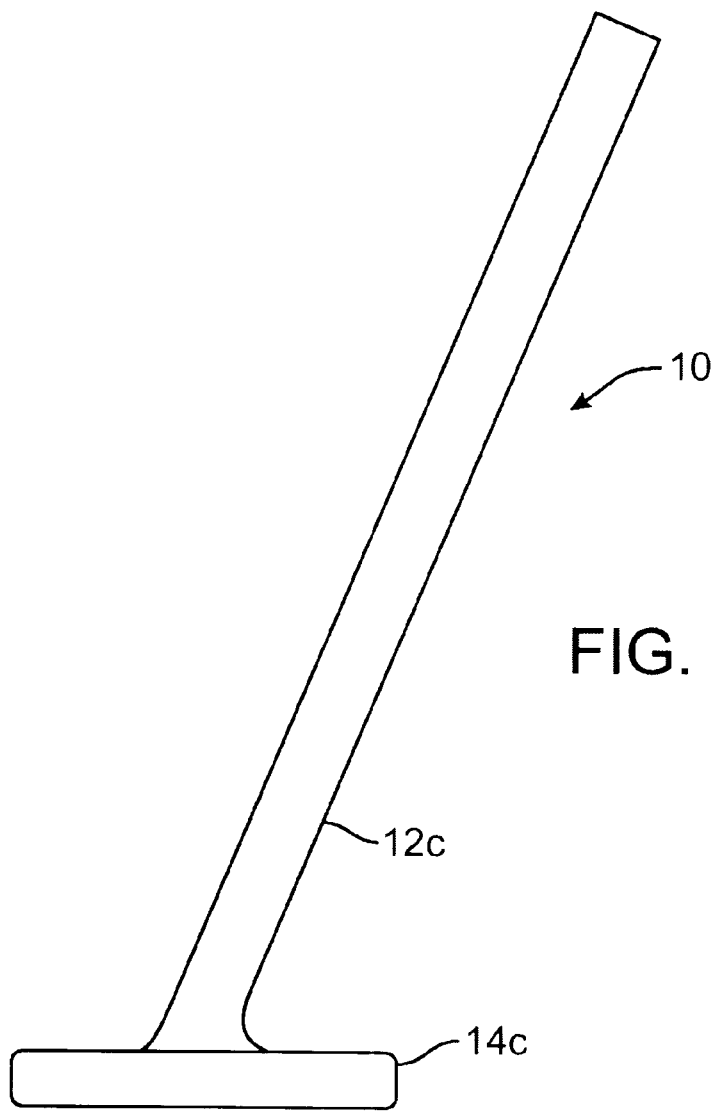
FIG. 11 is side view of a fifth embodiment having a slanted handle.

FIG. 11 is side view and FIG. 12 a top view of a fifth embodiment of the stirrer 10. The handle 12c of the fifth embodiment is slanted from vertical with respect to the top planar surface 22 of the mixing disk 14c. The slanted handle 12c may provide a better or more ergonomical grip for moving the stirrer 10 in the up and down motion. The slant of the handle 12c may be anywhere from approximately 75 to 90 degrees, preferably between 80 and 90 degrees and more preferably between 85 and 90 degrees.

Figure 13:
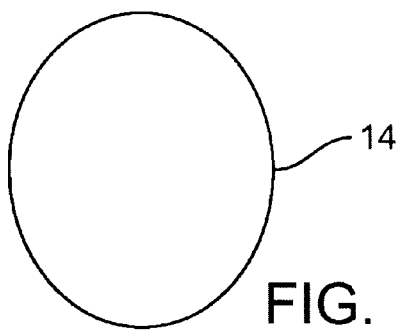
FIGS. 13–17 show alternate configurations of the mixing element.
Figure 14:
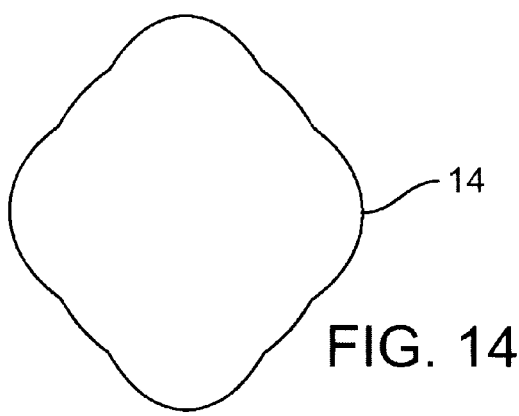
Figure 15:
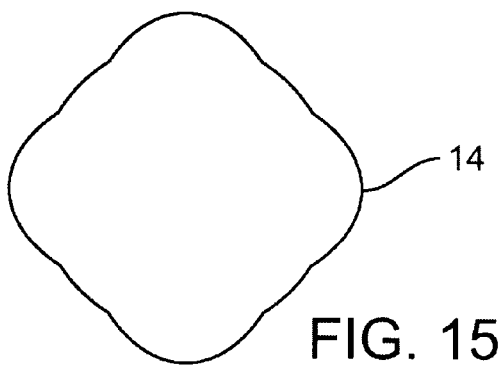
Figure 16:
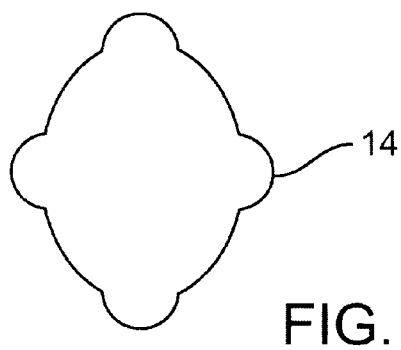
Figure 17:
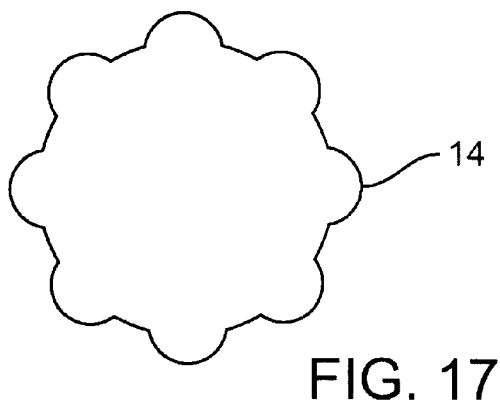

The mixing element may take other forms. For example, FIGS. 13–17 show a few possible alternate configurations of the mixing element 14. In FIG. 13, the mixing element 14 is oval. FIGS. 14–16 show different sizes of a rounded diamond shape. In FIG. 17, the mixing element 14 is generally round with rounded lobes extending out therefrom.

Figure 18:
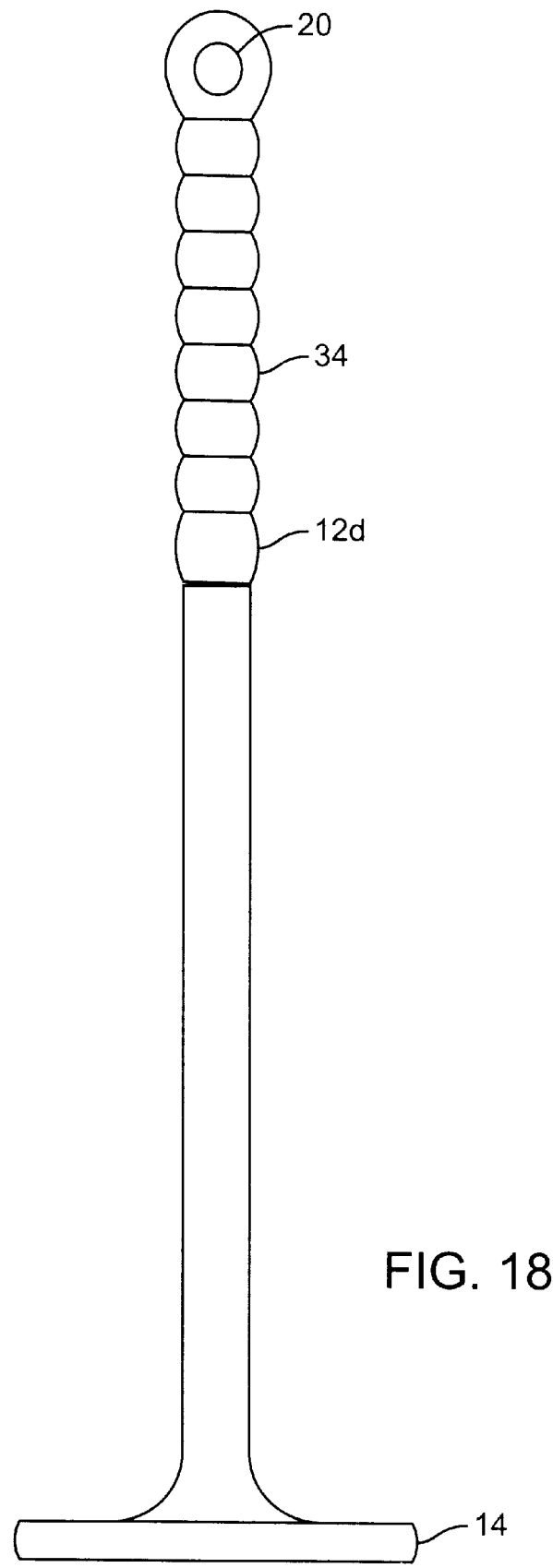
FIG. 18 is a sixth embodiment having a knurled handle.

FIG. 18 shows a sixth embodiment of the stirrer 10 having a knurled handle 12d. The handle 12d may have knurls or ridges 34, as shown, or any other projection extending outward from the surface of the handle 12d. The projections 34 may also be created by depressions in the surface of the handle 12d. The projection(s) 34 provide improved traction for the user gripping the handle 12d, thereby improving the ease of motion when using the device 10. Alternately, the handle 12d could include a coating or be formed of non-slip or slip-resistant material to improve gripping. The sixth embodiment also includes the optional suspension hole 20.

For mixing of food products, the stirrer 10 may be made from any non-toxic, reasonably durable material, such as plastic, metal and wood. If used with non-food items, the stirrer 10 could be created from other materials.

Many features have been listed with particular configurations, options, and embodiments. Any one or more of the features described may be added to or combined with any of the other embodiments or other standard devices to create alternate combinations and embodiments.

Although the examples given include many specificities, they are intended as illustrative of only one possible embodiment of the invention. Other embodiments and modifications will, no doubt, occur to those skilled in the art. For example, although the stirrer 10 is especially well suited for mixing dry ingredients into a liquid, other mixing processes may also benefit from the present invention. For example, mixing of syrups, honey or other thick liquid into water or other beverage may be expedited by mixing with the present invention. In other variations, the handle 12 may be attached to the side 26 or periphery of the mixing element 14 or near the edge 26 of the mixing element. Thus, the examples given should only be interpreted as illustrations of some of the preferred embodiments of the invention, and the full scope of the invention should be determined by the appended claims and their legal equivalents.

I claim:

1. A stirrer for mixing an additive into a liquid, said stirrer comprising:
    a flattened, solid mixing element, having a top surface, a flat bottom surface, a periphery forming an edge connecting said top and bottom surfaces and a groove extending into said bottom surface, thereby creating a depression therein, said mixing element lying generally within a plane,
    a handle having a first end fixedly attached to said mixing element at an angle between 75 and 90 degrees to said plane.

2. The stirrer of claim 1 further comprising a rim extending upward from said periphery of said mixing element creating a depression in said top surface.

3. The stirrer of claim 1 wherein said groove is generally straight and further comprising a second generally straight groove extending into said bottom surface, thereby creating a second depression therein, said grooves being generally perpendicular to one another.

4. The stirrer of claim 1 wherein said mixing element is a disk.

5. The stirrer of claim 1 wherein said mixing element takes a form chosen from the group of forms including round, rounded diamond, oval and generally round with rounded lobes extending out therefrom.

6. The stirrer of claim 1 wherein said handle is connected generally perpendicular to said top surface of said mixing element.

7. The stirrer of claim 1 further comprising a hole extending through said handle at a second end thereof.

8. The stirrer of claim 1 further comprising at least one projection extending from said handle.

9. A stirrer for mixing all additive into a liquid, said stirrer consisting of:
    a flattened, generally planar, solid mixing element, having a top surface, a flat bottom surface, a periphery forming an edge connecting said top and bottom surfaces and a groove having a first end and a second end and extending into said bottom surface, thereby creating a depression therein, said first and second ends of said groove extending to said periphery,
    a handle having a first end attached to a central portion of said top surface of said mixing element.

10. The stirrer of claim 9 wherein said mixing element has a rim extending upward from said periphery creating a depression around said central portion.

11. The stirrer of claim 9 wherein said groove is generally straight and further comprising a second generally straight groove, said two grooves being generally perpendicular to one another.

12. The stirrer of claim 9 wherein said mixing element takes the form of a disk.

13. The stirrer of claim 9 wherein said handle is connected generally perpendicular to said top surface of said mixing element.

14. The stirrer of claim 9 wherein said angle is connected to said mixing element at an angle to said top surface, said angle being in the range of 75 to 90 degrees.

15. The stirrer of claim 9 wherein said handle has a hole extending therethrough.

16. The stirrer of claim 9 wherein said handle is fixedly attached to said mixing element.

17. A stirrer for mixing an additive into a liquid, said stirrer comprising:
    a flattened, solid mixing element, having a continuous top surface, a flat bottom surface, a periphery forming an edge connecting said top and bottom surfaces, a rim extending upward from said periphery creating a depression in said top surface and a groove extending into said bottom surface, thereby creating a depression therein, said mixing element lying generally within a plane,
    a handle having a first end fixedly attached to said mixing element at an angle between 75 and 90 degrees to said plane.

18. The stirrer of claim 17 wherein said mixing element takes the form of a disk.

* * * * *